US010223098B2

(12) United States Patent
Lancioni et al.

(10) Patent No.: US 10,223,098 B2
(45) Date of Patent: Mar. 5, 2019

(54) METHOD AND SYSTEM TO ACCELERATE IOT PATCH PROPAGATION AND REDUCE SECURITY VULNERABILITIES EXPOSURE TIME

(71) Applicant: Intel Corporation, Santa Clara, CA (US)

(72) Inventors: German Lancioni, Cordova (AR); Simon Hunt, Naples, FL (US); Matthew D. Wood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,219

(22) Filed: Mar. 31, 2017

(65) Prior Publication Data
US 2018/0285088 A1    Oct. 4, 2018

(51) Int. Cl.
| G06F 8/65 | (2018.01) |
| H04W 4/70 | (2018.01) |
| H04W 4/50 | (2018.01) |
| H04W 4/80 | (2018.01) |

(52) U.S. Cl.
CPC ............... *G06F 8/65* (2013.01); *H04W 4/50* (2018.02); *H04W 4/70* (2018.02); *H04W 4/80* (2018.02)

(58) Field of Classification Search
None
See application file for complete search history.

(56) References Cited

U.S. PATENT DOCUMENTS

| 7,363,480 | B1 * | 4/2008 | Righi | G06F 8/65 709/219 |
| 2013/0185548 | A1 * | 7/2013 | Djabarov | H04L 41/082 713/2 |
| 2015/0334513 | A1 * | 11/2015 | Lotito | H04M 1/7253 455/41.1 |
| 2016/0092198 | A1 * | 3/2016 | Vangeel | G06F 8/654 717/173 |
| 2016/0196128 | A1 * | 7/2016 | Wang | H04L 67/34 717/173 |
| 2018/0081666 | A1 * | 3/2018 | Surdu | G06F 8/65 |

OTHER PUBLICATIONS

Crutchfield, "What are firmware updates?", 2015, https://www.crutchfield.com.*

* cited by examiner

*Primary Examiner* — Hossain M Morshed
(74) *Attorney, Agent, or Firm* — Barnes & Thornburg LLP (57) ABSTRACT

Techniques for allowing devices to obtain software updates are described. In one scenario, a device broadcasts request for updates to nearby devices of the same type, at least one of which responds indicating an available update. The device requesting the update broadcasts a request for the available update to nearby devices, at least one of which provides at least a portion of the update. In another scenario, a device broadcasts requests for update to nearby devices manufactured by the same manufacturer. At least one device may provide the update, responsive to a determination that the update is available. Alternately, responsive to a determination that the update is not available, the device receiving the broadcast may respond saying the update is not available, then attempt to update the update from an update server. Upon receiving a later broadcast, the device having the update may provide the update to the requesting device.

20 Claims, 6 Drawing Sheets

METHOD AND SYSTEM TO ACCELERATE IOT PATCH PROPAGATION AND REDUCE SECURITY VULNERABILITIES EXPOSURE TIME

TECHNICAL FIELD

Embodiments described herein generally relate to the field of Internet of Things (IOT) devices, and in particular to techniques for accelerating IOT patch propagation, reducing the amount of time devices are exposed to security vulnerabilities.

BACKGROUND ART

Nowadays propagating patches to diverse IoT devices is not a simple task, especially considering that many IoT devices are designed to operate in unfavorable conditions, without reliable Internet access and without user assistance. Examples of these kinds of devices include home appliances, such as washing machines or fridges (sometimes referred to as white goods, because they are frequently white in color); low power connected home automation devices, such as motion sensors, door locks, window sensors; and automotive devices (cars and accessories).

Unfortunately, many "smart" devices are not necessarily always connected directly to the Internet due to the high power required for Wi-Fi connectivity, or not connected because consumers fear "hackers" or simply don't want to or are unable to connect them. At the same time, manufacturers want to patch these devices quickly, especially when critical vulnerabilities are discovered.

Even if the devices are online, propagating a patch to millions of devices can take a considerable amount of time and resources. In the event of a security-related critical patch, manufacturers want to propagate the patch as fast as possible, while at the same time reducing the resources consumption.

BRIEF DESCRIPTION OF DRAWINGS

FIG. 6 is a block diagram illustrating a network of devices for accelerated patch propagation according to one embodiment.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As used herein the term "software" includes any type of data and executable code that may be processed by a programmable device, and includes firmware. As used herein, the term "firmware" includes any type of data and executable code that may be processed by a programmable device and which is installed or installable on the device in a typically read-only memory. Typically firmware may be stored in a read-only or other non-volatile memory of the device by the manufacturer of the device.

As used herein, the terms "update" and "patch" are used interchangeably when describing the file of changes to the software of a device that need to be obtained and installed on the device. In some cases, an update may involve replacement of all or portions of the software to be updated; in other cases, an update may involve making changes to one or more specific instructions or bits or bytes of data, as defined in the update file.

The description below proposes a method and system for reaching devices that may be periodically inaccessible and patching them quickly and efficiently, without necessarily relying on ideal patching conditions (e.g. having an Internet connection) or relying on each device individually receiving patches from a centralized location. With the proposed solution, patch propagation is not only more effective, but also faster, reducing the amount of time those devices may be exposed to vulnerabilities patched by the patches.

The basis for the techniques involves taking advantage of the "network" proximity of devices, regardless of the nature of the devices, to accelerate the patch propagation for both online and offline devices. Solutions described below cover scenarios in which non-self-sufficient devices can be patched with the help of other devices, even though the others are totally different kinds of devices.

The patch propagation is made through a parallel (local, proximity-based) channel by sharing blocks of the patch held by an already-patched, or higher function device with a device having an old-version of the software. The sharing technique uses an opportunistic peer to peer schema, without requiring a tracker server. Where devices are not the same kind of device (e.g. washing machine vs. an IP camera), the Internet-enabled device, on request from another, typically lower-function, device, communicates with an update server that provides patch blocks for sending to the unpatched device, which may be offline. The patches may be stored so later these patches can be used for patch propagation without the update server.

Thus, for example, a local (in-home) request for a block of data representing some patch by a low function device may be serviced by a similar device in the home which already has the requested block, or the request may trigger a higher function device to retrieve the needed block and make it available for future in-home requests. The technique is not limited to fixed object, but as described below, may be used in vehicles or other types of devices while those devices are moving.

The techniques described below provide a way to accelerate patch propagation to devices worldwide, reducing the exposure time of vulnerabilities, even where those devices are not connected to the Internet. Although described below in terms of an automotive application, the techniques applies to other scenarios such as home devices.

Sending a critical patch to thousands of devices is a challenging task, especially where in future there may be hundreds of similar devices in one home (occupancy sensors, security sensors, etc.). In the case of smart vehicles today, owners typically need to go to the car dealership to get the vehicle patched. Even in the future, although one might expect that cars will be always connected, the likelihood is that this will not be always the case. For example:

a) Vehicles on the road or in the field may not have signal coverage for long periods of time b) Owners may opt-out of having an always-connected vehicle, or automatic updates c) Connectivity on cars may cost money to owners, who may choose not to pay for connectivity d) Vehicles may have defects or network issues that would prevent connecting to update servers e) Future privacy and safety regulations may restrict patching opportunities Other reasons may exist for devices not having always-on network connections. Therefore, having a backup solution for propagating patches without necessarily relying on the devices being online or the owner's willingness to patch the device would be desirable.

With the proposed solution, patch propagation can be accelerated without compromising extra resources, incurring any charges, or being inconvenient to the user. On the contrary, by using opportunistic patch block propagation through locally available channels, devices can be patched on the-move without necessarily having Internet or ordinary wireless networking connections.

Figure 1:
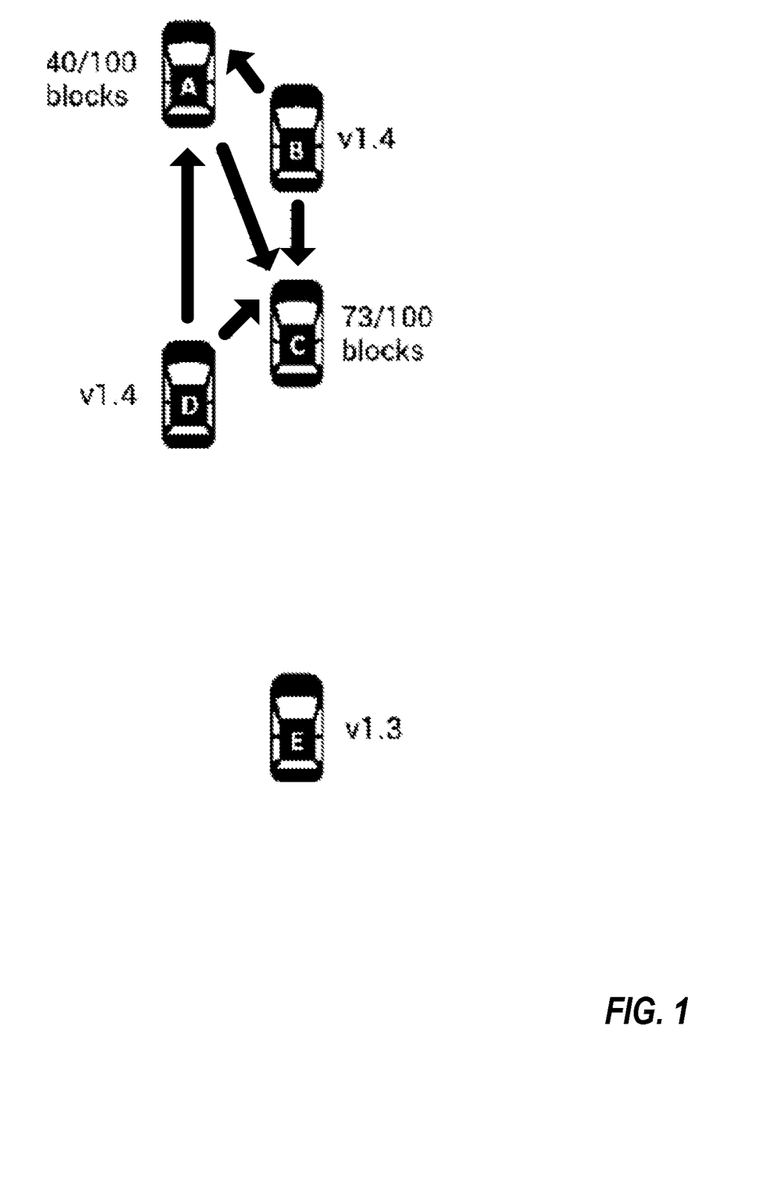
FIG. 1 is a block diagram illustrating updating firmware in an automobile according to one embodiment.

FIG. 1 is a block diagram illustrating an application in which firmware of a vehicle may be updated while the vehicle is being driven, using an opportunistic peer-to-peer networking connection. As used herein, "opportunistic" means that the peer-to-peer connection is a temporary ad hoc connection that is made when one device is within range of another device with a similar ad hoc peer-to-peer networking capability.

In this example, vehicles on the move may be able to synchronize with surrounding vehicles during short periods of time when the vehicles are relatively close to each other. Any type of vehicle may provide this capability, although trucks and consumer automobiles may be the most common types of vehicles to employ the techniques. The techniques could be used on ships or airplanes, for example. Although described in terms of a vehicle, the techniques are not limited to vehicles, but may be used by any type of mobile device, including mobile phones or any other type of mobile device that may be carried or transported from place to place.

In FIG. 1, Cars A and C are vehicles attempting to update firmware or software using these updating techniques. As illustrated, the patch comprises 100 blocks of code and other data, and car A has obtained 40 blocks of the patch, while car C has obtained 73 blocks of the patch. Cars B and D contain full copies of the newest version of the firmware, version 1.4 in this example.

As Car C approaches cars A, B, and D (or as one or more of them approach Car C), Car C attempts to discover the presence of other vehicles within range. Cars C and D may respond to discovery attempts and indicate that they each contain version 1.4 of the software. Car C may then connect with cars D or B to obtain the missing 27 blocks of the patch, then once all 100 of the blocks are obtained, perform the necessary steps to install the software. Car C need not obtain all 27 blocks from Car D, but may obtain some of the blocks from Car D, and some from Car B.

Car A also attempts to obtain blocks of the patch to version 1.4 from Cars B and D. If Car A is able to obtain blocks that Car C does not have, Car C may also obtain those blocks from A, in addition to Cars B and D. At any time, as other cars come in range or Cars B or D go out of range of Car C, Car C may make or drop opportunistic network connections with the other cars.

In this example, Car E, also having an older version of the software than either Cars B or D, is out of range of Cars A-D, and does not participate in sharing blocks of code with any of those cars. But once Car E does come into range, Car E may also participate in the code sharing.

In the type of scenario of FIG. 1, in some embodiments, Cars A-D may be cars manufactured by the same automobile manufacturer. There may be other cars in range of (say) Car C made by other manufacturers that may not be able to participate in the software patch sharing. Because of the difference in manufacturer, no network connection may be made or a connection may be made, but the needed software is not available. However, in some embodiments, software that is installed on cars from multiple manufacturers (for example, software from a mobile phone manufacturer that may be provided in a wide variety of cars) may have patches that could be shared between cars from different manufacturers.

Because the vehicles may be in range of each other for only short periods of time, the networking connection should be capable of fast establishment and fast tear down, and the patching functionality should be capable of obtaining partial patches during the short time the connection exists, and picking up the process from the next vehicle that comes in range capable of sharing the patch.

Even if the vehicle, such as Car A or Car C, has a network connection to download the patch by itself, leveraging this patch propagation solution is still valuable, because use of the technique reduces the utilization of that network connection, accelerates the propagation (as a whole), and reduces the vulnerabilities exposure time until the critical patch is applied. So in the case of the automotive example above, if Car C has an over-the-air (OTA) network connection the Internet and is downloading a patch directly from an update server (not shown in FIG. 1), Car C can also download some blocks from the other near-by vehicles Cars A, B, or D as described above, thus accelerating the patch process and reducing resources consumption (e.g., OTA network load).

A similar process can occur in a more local scale with fixed devices, or devices that only move in a limited area, such as within a future smart home. For example, consider the case of a home served by hundreds of smart light bulbs. Patching each bulb individually from a central hub inefficient and time consuming. Since each bulb is aware of others in its estate, embodiments described herein can be leveraged so once notification of an update is presented by the manufacturer, as each bulb requests blocks of data which cumulatively comprise the firmware update, these blocks can be served by other bulbs, other devices in the home, or direct from the manufacturer. Unlike the car example of FIG. 1, connectivity between devices may be more likely to be persistent, since they are not moving rapidly relative to each other, but the in-home connectivity may be of poor quality and subject to interference.

The techniques described herein generally fall into three scenarios:

1. Devices of the same kind, i.e., similar devices from the same manufacturer
2. Devices of different kind, but from the same manufacturer, e.g., different home appliances of the same brand.
3. Devices from different manufacturers, where a scheme of update cooperation has been pre-agreed.

When an IoT device A is awake and running, it may first try to check for updates as usual through the factory-defined method, e.g., pinging an update server through Wi-Fi or cellular data Internet connection. If the device is unable to obtain the patch, for example because of temporary a connectivity loss, the device may switch to a discovery mode for near-by devices through the same or different communication interfaces. The communication interface may be the same adapter working in a different mode such as Wi-Fi Direct® or a different communication interface such as a Bluetooth® connection. (BLUETOOTH is a registered trademark of Bluetooth SIG. WI-FI DIRECT is a registered certification mark of W-Fi Alliance.) The underlying communication would be determined by the communication interface and is not further described herein. Alternately, even if the device is able to connect to the update server, the discovery mode techniques may be used in addition to accelerate the reception of the patch.

The different scenarios may employ different protocols for making the opportunistic connection and obtaining the patch. In one embodiment, corresponding to scenario 1 wherein the devices are of the same kind, a protocol such as the protocol 200 illustrated in the dataflow graph of FIG. 2 may be used.

Figure 2:
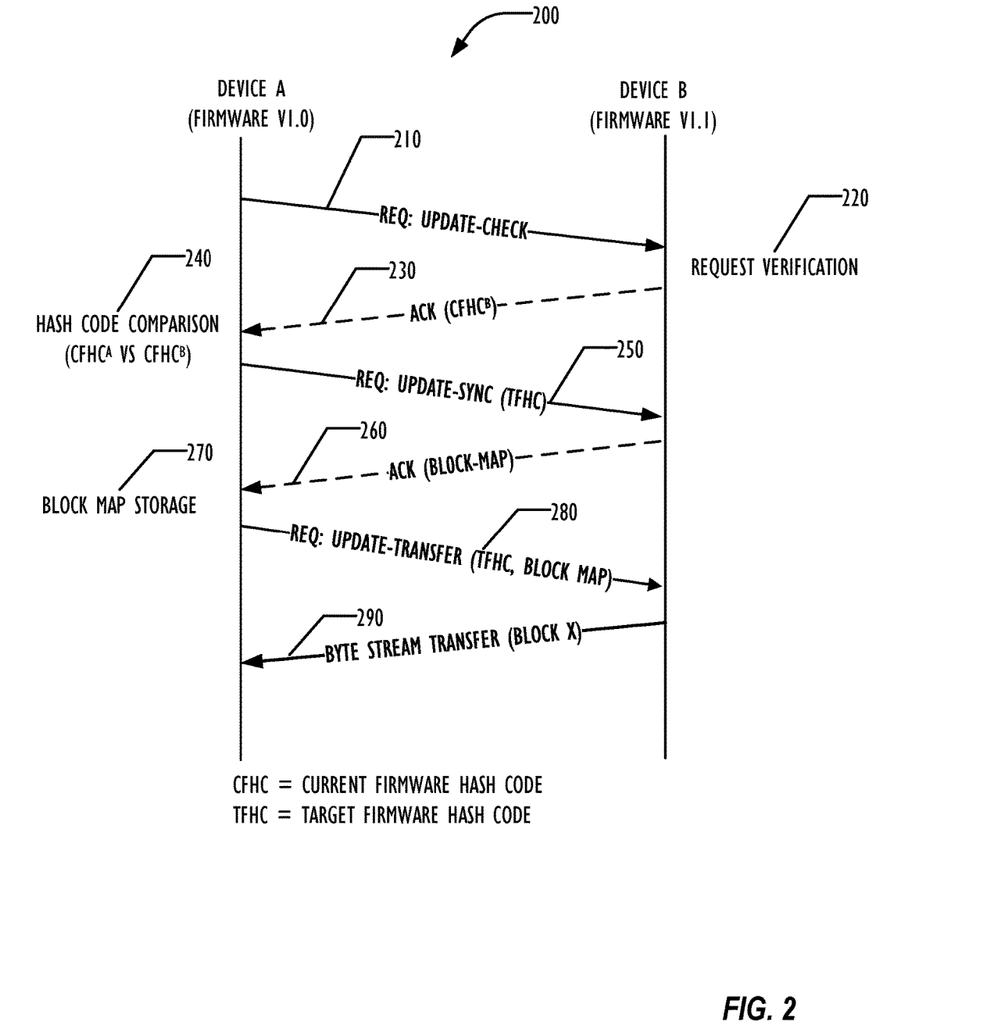
FIG. 2 is a dataflow graph illustrating a handshaking protocol for accelerated patch propagation between devices of the same kind according to one embodiment.

In the discussion of FIG. 2 below, the communication is preferably encrypted, using any desired encryption techniques. Embodiments may eliminate the encryption if desired, but at a risk of a less secure process. Propagation of encryption keys is outside the scope of this disclosure and is not described further herein. Any desired method for propagation of necessary encryption keys may be used. Instead of encryption of the communications, embodiments may use digital signing techniques if desired.

During discovery mode, the IoT device A may detect near-by devices by broadcasting an update-check request 210, which can be de-encrypted and verified in action 220 by devices of the same kind (e.g., vehicles of the same manufacturer). Other types of devices may receive the update check request 210, but cannot decrypt it or verify the request.

If a near-by device B is able to attend to the update-check request 210, it may acknowledge the update-check request 210. In one embodiment, the acknowledgement 230 may include data for use in identifying the current software version running on device B. In some embodiments, the identification data may be any kind of version identifier, such as a number or other version data. In other embodiments, the identification may be a hash value corresponding to the current firmware version running on the device B, using any desired hashing technique such as Secure Hash Algorithm-3 (SHA-3), preferably one in which the hash value of a later version of the firmware is greater than the hash value of an earlier version. In the example of FIG. 2, device B is running firmware version 1.1, while device A is running firmware version 1.0, an earlier version.

Upon receipt of the acknowledgment 230, device A may compare the identification data to determine if a new update is available from device B. In the event the identification data indicates no updated version is available from device B and no other device responds to the update-check request 210 with identification data indicating a new update is available, device A may continue broadcasting update-check requests. In a situation where multiple devices acknowledge the update check request 210, device A may evaluate the received acknowledgement and determine which other device to continue to communicate with for an update. In one embodiment, the determination is based on which device responding to the update check request 210 reports the most current update. In other embodiments, device A may make a decision based on other criteria, including other information that may be provided from the responding devices in the acknowledgement 230. For example, if a particular update is known to have problems, as occasionally occurs, device A may choose not to request blocks of that update, even if that update is the most current update available. In another example, a given update version might have multiple sub-versions, such as sub-versions containing different localization data. In that scenario, device A may determine to communicate further only with the other device reporting an updated version of the desired sub-version, so that (for example) an English version of device A's firmware does not get updated with blocks for a French version that is otherwise a more up to date version of the firmware.

In one embodiment, the update-check request 210 may be broadcast on a predetermined schedule (e.g., on a daily or weekly basis) and repeated broadcasts of an unfulfilled update check request 210 may be made on the same predetermined schedule or a different once, as desire. Receiving an indication that no new update is available from device B may not mean that no new update is available anywhere, but could mean that device B has also not been updated to the newest version of the software.

If device A detects that the identification information or hash code provided by device B resolves on a more recent firmware version, device A may switch to a second stage of the handshaking protocol. At this point, device A may start sending update-sync requests 250 to near-by devices. In some embodiments the update-sync request may include the hash code of the firmware version that is trying to acquire. In other embodiments, the update-sync request may include other target version identification information, in addition to or instead of the hash code.

In one embodiment, the update-sync request 250 may be broadcast. In other embodiments, the update-sync request 250 is sent only to the other device B that answered the update-check request 210 with acknowledgement 230 and was selected by device A as a source of the update. In some embodiments, the device that receives and responds to the update-sync request 250 may be a different device than device B, which performed the previous portions of the handshaking protocol. In other embodiments, the update-sync request 250 may be sent without requesting a specific update in the update-sync request 250.

When near-by device B receives the update-sync request 250, it may transfer a block map of the firmware to device A in response 260. This block map contains the information about the update that device A needs to download from either other devices, the Internet, or both. Any desired format for the block map may be used. The device A may use the block map to recognize when it has obtained all of the update, such as by indicating which blocks of the update have been received by device A.

Once device A receives the block map of the firmware to be obtained, device A starts broadcasting update-transfer requests 280 to near-by devices. In one embodiment, the update-transfer request 280 may contain a filtered map of the missing blocks that device A is willing to obtain, so only near-by devices owning the missing blocks will respond. Device A may receive blocks of the update in any order, and may receive one or more blocks from multiple devices, because the ephemeral nature of the connection between devices may cause multiple connections and disconnections while downloading the update. The devices receiving and responding to the update-transfer request 280 may be different from the devices responding to the update-check request and update-sync request.

When a near-by device B (or any other nearby device) receives the update-transfer request, if device B has at least one of the requested blocks, a byte stream transfer 290 is started from device B to device A. This process is repeated between device A and other devices C, D, etc. until all the blocks of the update are completely transferred.

In some embodiments, for additional security of the transmission, each block of the byte stream transferred to device A may be encrypted and decrypted by device A upon receipt. In some embodiments, each block of the byte stream may contain a digital signature or other information that can be used by device A to verify that each of the blocks received are valid update blocks and correspond to the desired update version. In some embodiments, because device A may receive blocks of the update in any order, each block may contain information that allowed device A to identify which block of the block map has been received. If device A receives a block a nearby device that device A already has, such as when device A received the same block from multiple nearby devices, device A may either replace the previous obtained block with the newly obtained block or simply discard the newly obtained duplicate block as desired.

Once device A obtains all the blocks of the update, device A may run whatever procedure has been defined on device A for applying or installing the updates. In some embodiments, the update may contain instructions on how to apply the update on device A. The installation or application of the update may occur at any appropriate moment according to device A's operational rules. In one embodiment, updates are applied immediately. In another embodiment, updates are applied according to a predetermined schedule. In yet another embodiment, updates may be applied at a time when device A is otherwise idle or lightly active.

Figure 3:
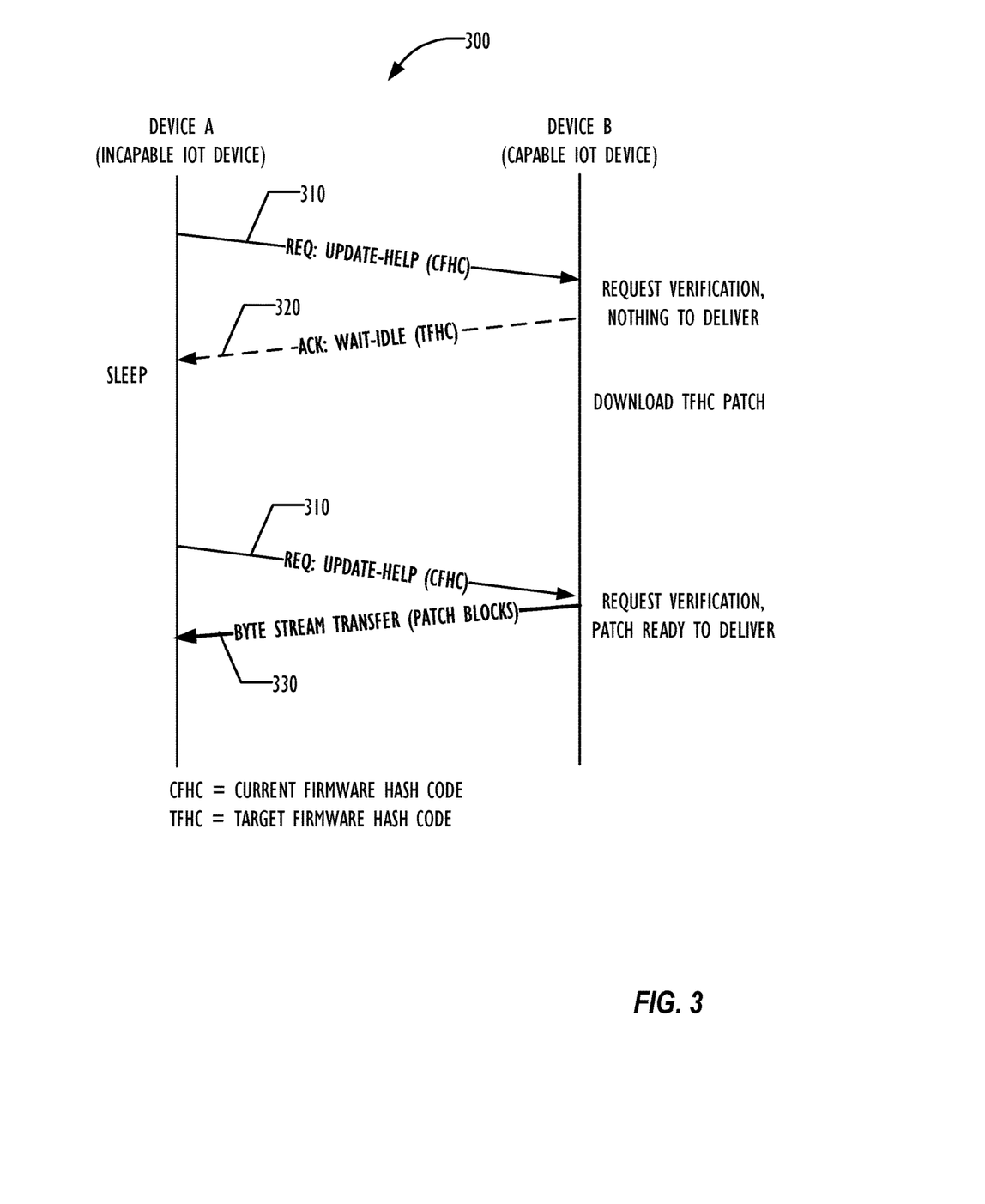
FIG. 3 is a dataflow graph illustrating a handshaking protocol for accelerated patch propagation between devices of different kinds manufactured by the same manufacturer according to one embodiment.

FIG. 3 is a dataflow graph illustrating a protocol 300 for scenario 2, where devices of different kind, but from the same manufacturer, e.g., different home appliances of the same brand, can assist other devices to obtain an update.

This scenario applies when an IoT device A is incapable of communicating with the update server directly either because device A does not have an Internet communication interface (at least at the moment) or because device A is not properly configured. A washing machine would be a good example. Although the washing machine may be capable of connecting to Internet, it may happen that the user did not configure the Wi-Fi credentials, thus the washing machine does not have access to the Internet. Eventually after some time, this washing machine will become isolated in terms of Internet access and may be running a deprecated and even vulnerable firmware version.

To this issue, during a discovery mode, the IoT device A (following the above example, a washing machine) may detect nearby devices by broadcasting an update-help request 310, which can be unencrypted and verified by devices of the same manufacturer (e.g. a smartphone, a smart TV, a home router, a refrigerator, etc.). The update-help request 310 is intended to find an Internet capable device that will verify with the update server whether there is a new update available for device A. As in the discussion of FIG. 2, although described herein as using encrypted communications, some embodiments may not use encryption for some or all of the communications.

When a device B (e.g., a smart TV) receives the update-help request 310 and is Internet-capable, then device B may extract device A's current firmware identification data from the incoming update-help request 310. Because the communication with device A is done through an alternate communication path that does not depend upon Internet connectivity, device B may not have Internet connectivity, even though it can receive the broadcast from device A. But assuming device B does currently have Internet connectivity, device B may extract the target firmware hash code or other desired version identification data from the incoming update-help request 310 and may contact a manufacturer update server (not illustrated in FIG. 3) to check for new updates on behalf of device A.

If there is a new firmware update available for device A, but device B does not yet have the update, device B may send a wait-idle answer 320 to device A, stating that device A should wait for a reasonable time and ask again later. In the meantime, device B may start downloading the patch for device A.

After a reasonable amount of time (e.g., after 1 hour), device A may resume the handshake protocol by sending the same update-help request 310. If device B still does not have the update available, device B may respond with the wait-idle response 320 as before. If by this time device B has downloaded the patch for device A, device B may initiate the byte stream transfer 330 of the patch.

In some embodiments, instead of initiating the byte stream transfer 330 of the patch, device B may send a block map as in a response 260 as described in FIG. 2, allowing device A to specify which blocks device A needs with an update-transfer request 280, at which point device B may transfer in the byte stream transfer 330 only those blocks needed by device A. Because the communication with device B may be ephemeral, "device B" may actually be multiple devices responding to device A as each successively is able to communicate with device A and the update server.

Although described above as sending update version information in the various requests and responses, in some embodiments instead of sending a version number or other version identifier, such as a hash value for the update, some embodiments may use other techniques, including passing date information between devices. An update file with an associated date that is greater than the date associated with a firmware already installed on device A or another update file for that software may considered a more current version of the update firmware or an update. So, for example, if device A has a firmware with a date of Jul. 1, 2016, any firmware with a date of Jul. 2, 2016 or later would be determined to be a newer version for the response to an update-check or for responding to an update-help request as described below. Embodiments could use just date or date and time for such determinations as desired.

As described above, device A requests and device B provides an update for software installed on device A, to bring the software on device A to a more current version. In some embodiments, device A may request a replacement for software installed on device A, regardless of the version installed on device A. In such a scenario, the software on device A may have been determined as corrupted, and a replacement with the same or later software is desired. Similar protocols to that described above in FIGS. 2 and 3 may be used to perform a replacement. Alternately, embodiments may allow device A to specify in an update-check or update-help request that any new software (not already installed on device A) should be provided by device B. In such an embodiment, addition requests and responses may be used to indicate what software is already installed on device A and what software not on device A is available, allowing device A to request delivery of the new software from device B, in both scenarios 1 and 2.

Figure 4:
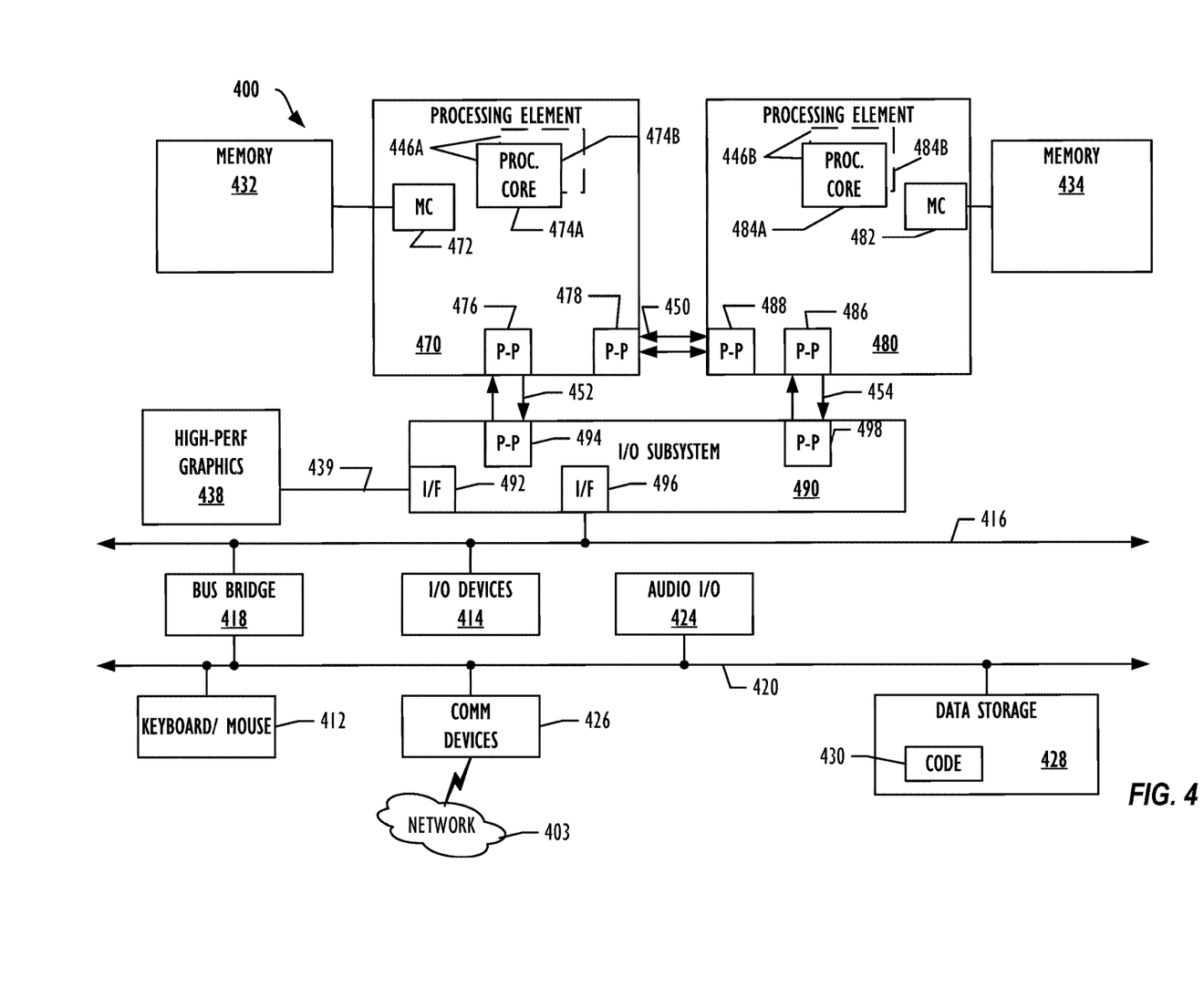
FIG. 4 is a flowchart illustrating a technique for accelerated patch propagation according to one embodiment.

Referring now to FIG. 4, a block diagram illustrates a programmable device FIG. 400 that may be used for implementing the techniques described herein in accordance with one embodiment. The programmable device FIG. 400 illustrated in FIG. 4 is a multiprocessor programmable device that includes a first processing element FIG. 470 and a second processing element FIG. 480. While two processing elements FIG. 470 and FIG. 480 are shown, an embodiment of programmable device FIG. 400 may also include only one such processing element.

Programmable device FIG. 400 is illustrated as a point-to-point interconnect system, in which the first processing element FIG. 470 and second processing element FIG. 480 are coupled via a point-to-point interconnect FIG. 450. Any or all of the interconnects illustrated in FIG. 4 may be implemented as a multi-drop bus rather than point-to-point interconnects.

As illustrated in FIG. 4, each of processing elements FIG. 470 and FIG. 480 may be multicore processors, including first and second processor cores (i.e., processor cores FIG. 474a and FIG. 474b and processor cores FIG. 484a and FIG. 484b). Such cores FIG. 474a, FIG. 474b, FIG. 484a, FIG. 484b may be configured to execute instruction code. However, other embodiments may use processing elements that are single core processors as desired. In embodiments with multiple processing elements FIG. 470, FIG. 480, each processing element may be implemented with different numbers of cores as desired.

Each processing element FIG. 470, FIG. 480 may include at least one shared cache FIG. 446. The shared cache FIG. 446a, FIG. 446b may store data (e.g., instructions) that are utilized by one or more components of the processing element, such as the cores FIG. 474a, FIG. 474b and FIG. 484a, FIG. 484b, respectively. For example, the shared cache may locally cache data stored in a memory FIG. 432, FIG. 434 for faster access by components of the processing elements FIG. 470, FIG. 480. In one or more embodiments, the shared cache FIG. 446a, FIG. 446b may include one or more mid-level caches, such as level 2 (L2), level 3 (L3), level 4 (L4), or other levels of cache, a last level cache (LLC), or combinations thereof.

While FIG. 4 illustrates a programmable device with two processing elements FIG. 470, FIG. 480 for clarity of the drawing, the scope of the present invention is not so limited and any number of processing elements may be present. Alternatively, one or more of processing elements FIG. 470, FIG. 480 may be an element other than a processor, such as an graphics processing unit (GPU), a digital signal processing (DSP) unit, a field programmable gate array, or any other programmable processing element. Processing element FIG. 480 may be heterogeneous or asymmetric to processing element FIG. 470. There may be a variety of differences between processing elements FIG. 470, FIG. 480 in terms of a spectrum of metrics of merit including architectural, microarchitectural, thermal, power consumption characteristics, and the like. These differences may effectively manifest themselves as asymmetry and heterogeneity amongst processing elements FIG. 470, FIG. 480. In some embodiments, the various processing elements FIG. 470, FIG. 480 may reside in the same die package.

First processing element FIG. 470 may further include memory controller logic (MC) FIG. 472 and point-to-point (P-P) interconnects FIG. 476 and FIG. 478. Similarly, second processing element FIG. 480 may include a MC FIG. 482 and P-P interconnects FIG. 486 and FIG. 488. As illustrated in FIG. 4, MCs FIG. 472 and FIG. 482 couple processing elements FIG. 470, FIG. 480 to respective memories, namely a memory FIG. 432 and a memory FIG. 434, which may be portions of main memory locally attached to the respective processors. While MC logic FIG. 472 and FIG. 482 is illustrated as integrated into processing elements FIG. 470, FIG. 480, in some embodiments the memory controller logic may be discrete logic outside processing elements FIG. 470, FIG. 480 rather than integrated therein.

Processing element FIG. 470 and processing element FIG. 480 may be coupled to an I/O subsystem FIG. 490 via respective P-P interconnects FIG. 476 and FIG. 486 through links FIG. 452 and FIG. 454. As illustrated in FIG. FIG. 4, I/O subsystem FIG. 490 includes P-P interconnects FIG. 494 and FIG. 498. Furthermore, I/O subsystem FIG. 490 includes an interface FIG. 492 to couple I/O subsystem FIG. 490 with a high performance graphics engine FIG. 438. In one embodiment, a bus (not shown) may be used to couple graphics engine FIG. 438 to I/O subsystem FIG. 490. Alternately, a point-to-point interconnect FIG. 439 may couple these components.

In turn, I/O subsystem FIG. 490 may be coupled to a first link FIG. 416 via an interface FIG. 496. In one embodiment, first link FIG. 416 may be a Peripheral Component Interconnect (PCI) bus, or a bus such as a PCI Express bus or another I/O interconnect bus, although the scope of the present invention is not so limited.

As illustrated in FIG. 4, various I/O devices FIG. 414, FIG. 424 may be coupled to first link FIG. 416, along with a bridge FIG. 418 that may couple first link FIG. 416 to a second link FIG. 420. In one embodiment, second link FIG. 420 may be a low pin count (LPC) bus. Various devices may be coupled to second link FIG. 420 including, for example, a keyboard/mouse FIG. 412, communication device(s) FIG. 426 (which may in turn be in communication with the computer network FIG. 403), and a data storage unit FIG. 428 such as a disk drive or other mass storage device which may include code FIG. 430, in one embodiment. The code FIG. 430 may include instructions for performing embodiments of one or more of the techniques described above. Further, an audio I/O FIG. 424 may be coupled to second link FIG. 420.

Note that other embodiments are contemplated. For example, instead of the point-to-point architecture of FIG. 4, a system may implement a multi-drop bus or another such communication topology. Although links FIG. 416 and FIG. 420 are illustrated as busses in FIG. 4, any desired type of link may be used. In addition, the elements of FIG. 4 may alternatively be partitioned using more or fewer integrated chips than illustrated in FIG. 4.

Figure 5:
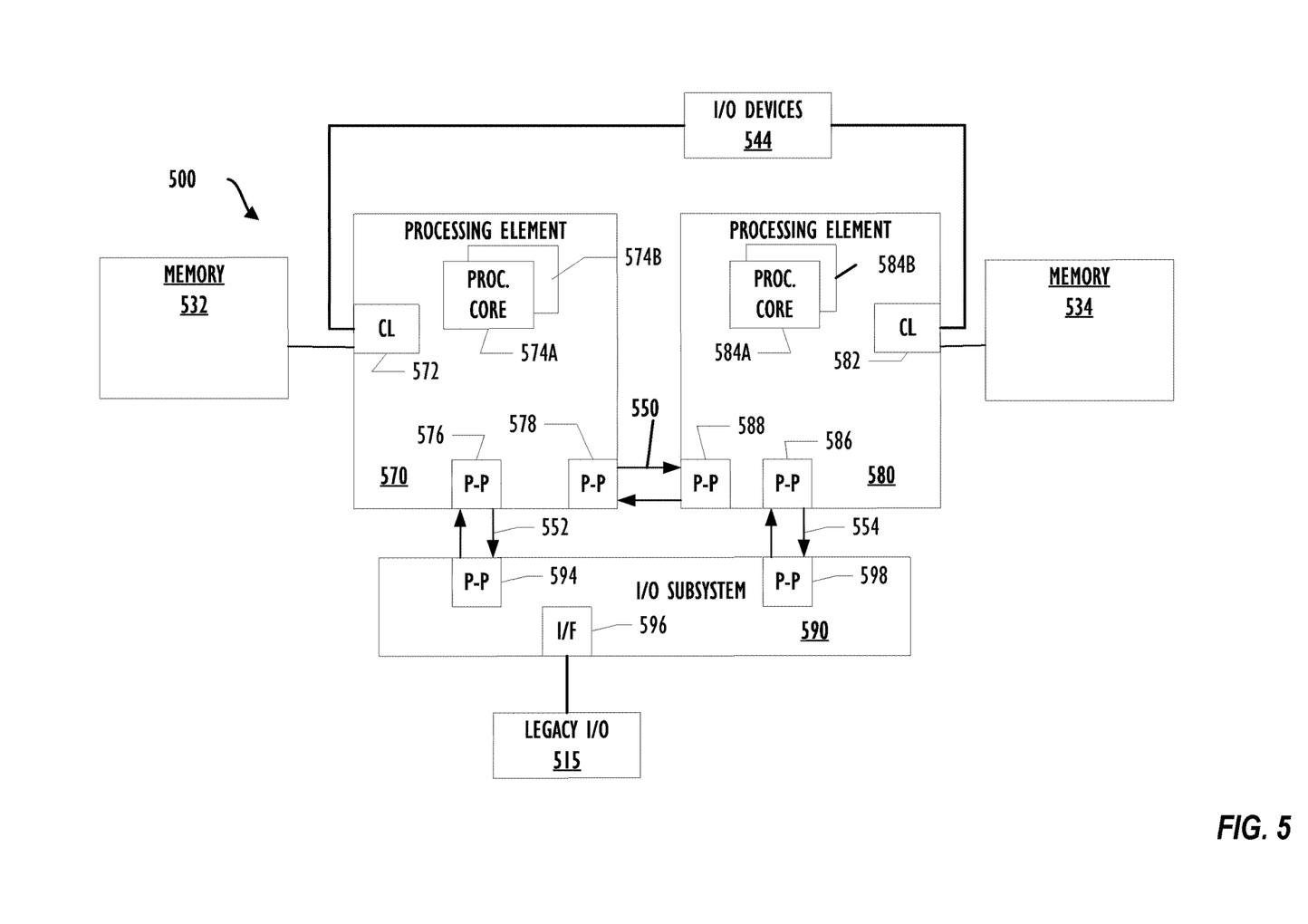
FIG. 5 is a block diagram illustrating a computing device for use with techniques described herein according to one embodiment.

Referring now to FIG. 5, a block diagram illustrates a programmable device FIG. 500 according to another embodiment. Certain aspects of FIG. 5 have been omitted from FIG. 5 in order to avoid obscuring other aspects of FIG. 5.

FIG. 5 illustrates that processing elements FIG. 570, FIG. 580 may include integrated memory and I/O control logic ("CL") FIG. 572 and FIG. 582, respectively. In some embodiments, the FIG. 572, FIG. 582 may include memory control logic (MC) such as that described above in connection with FIG. FIG. 4. In addition, CL FIG. 572, FIG. 582 may also include I/O control logic. FIG. 5 illustrates that not only may the memories FIG. 532, FIG. 534 be coupled to the CL FIG. 572, FIG. 582, but also that I/O devices FIG. 544 may also be coupled to the control logic FIG. 572, FIG. 582. Legacy I/O devices FIG. 515 may be coupled to the I/O subsystem FIG. 590 by interface FIG. 596. Each processing element FIG. 570, FIG. 580 may include multiple processor cores, illustrated in FIG. FIG. 5 as processor cores FIG. 574A, FIG. 574B, FIG. 584A and FIG. 584B. As illustrated in FIG. 5, I/O subsystem FIG. 590 includes point-to-point (P-P) interconnects FIG. 594 and FIG. 598 that connect to P-P interconnects FIG. 576 and FIG. 586 of the processing elements FIG. 570 and FIG. 580 with links FIG. 552 and FIG. 554. Processing elements FIG. 570 and FIG. 580 may also be interconnected by link FIG. 550 and interconnects FIG. 578 and FIG. 588, respectively.

The programmable devices depicted in FIG. 4 and FIG. 5 are schematic illustrations of embodiments of programmable devices that may be utilized to implement various embodiments discussed herein. Various components of the programmable devices depicted in FIG. 4 and FIG. 5 may be combined in a system-on-a-chip (SoC) architecture.

Figure 6:
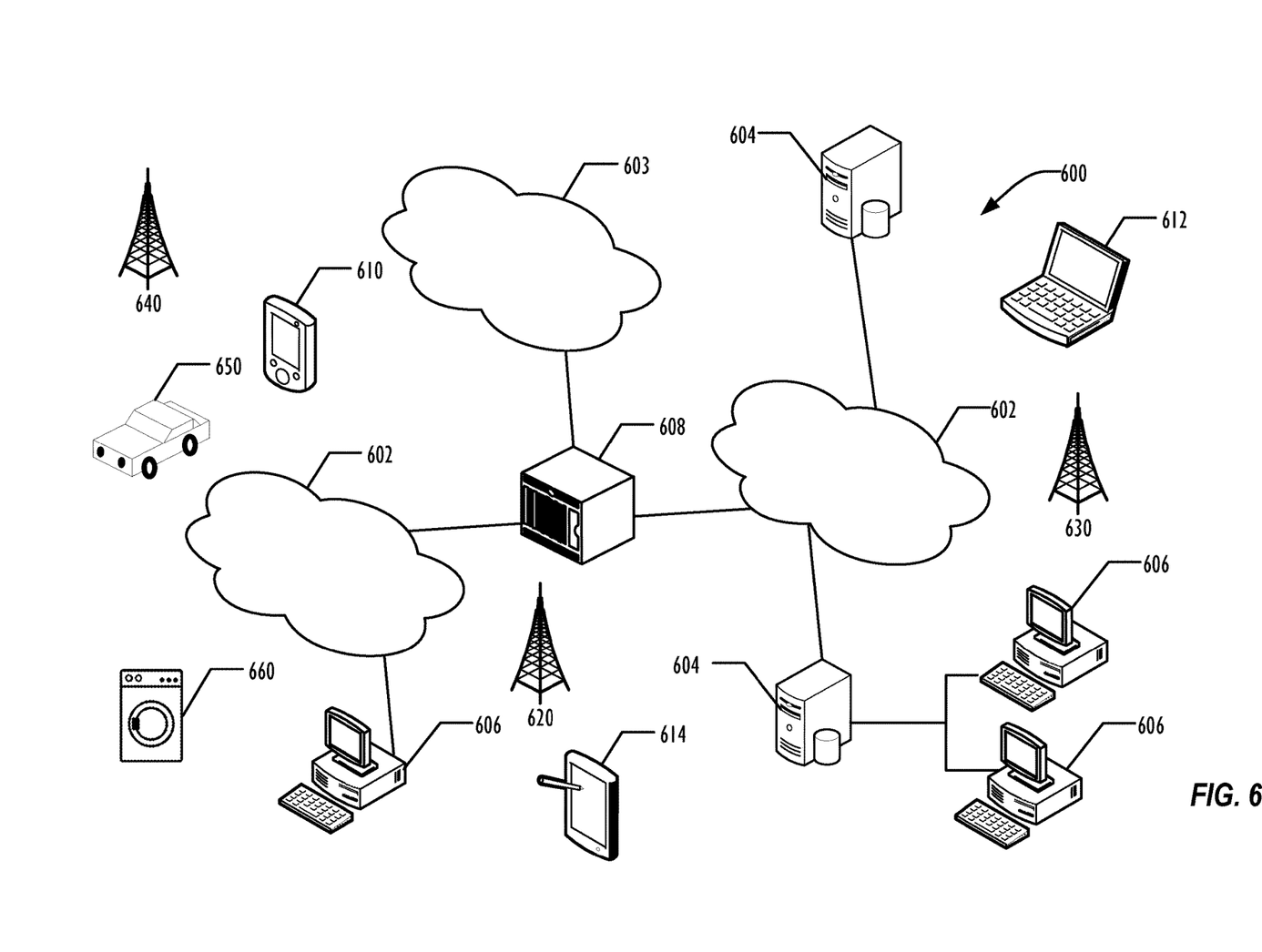
FIG. 6 is a block diagram illustrating a computing device for use with techniques described herein according to another embodiment.

Referring now to FIG. 6, an example infrastructure 600 in which the techniques described above may be implemented is illustrated schematically. Infrastructure 600 contains computer networks 602. Computer networks 602 may include many different types of computer networks available today, such as the Internet, a corporate network or a Local Area Network (LAN). Each of these networks can contain wired or wireless programmable devices and operate using any number of network protocols (e.g., TCP/IP). Networks 602 may be connected to gateways and routers (represented by 608), end user computers 606, and computer servers 604. Servers 604, for example, may be the update server that device B communicates with in the scenario 2 described above when discussing FIG. 3. Infrastructure 600 also includes cellular network 603 for use with mobile communication devices. Mobile cellular networks support mobile phones and many other types of mobile devices. Mobile devices in the infrastructure 600 are illustrated as mobile phones 610, laptops 612 and tablets 614. A mobile device such as mobile phone 610 may interact with one or more mobile provider networks as the mobile device moves, typically interacting with a plurality of mobile network towers 620, 630, and 640 for connecting to the cellular network 603. Although referred to as a cellular network in FIG. 6, a mobile device may interact with towers of more than one provider network, as well as with multiple non-cellular devices such as wireless access points and routers 608. In addition, the mobile devices 610, 612 and 614 may interact with non-mobile devices such as computers 604 and 606 for desired services. In addition to traditional mobile devices such as smart phones 610, laptops 612, and tablets 614, other types of devices may participate in this infrastructure 600, such as vehicle 650, and appliance 660 (in this example, a washing machine). Any of the devices illustrated in FIG. 6 may act as device A or device B in the handshaking protocols described above.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

The following examples pertain to further embodiments.

Example 1 is a machine readable medium on which are stored instructions, comprising instructions that when executed cause a machine to: broadcast a request for updates to nearby devices; receive an acknowledgment identifying an available update from a first nearby device; broadcast a request for the available update to nearby devices; and receive a portion of the available update from a second nearby device.

In Example 2 the subject matter of Example 1 optionally includes wherein the first nearby device and the second nearby device are the same device.

In Example 3 the subject matter of Example 1 optionally includes wherein the machine and the first nearby device are the same type of device.

In Example 4 the subject matter of any of Examples 1-3 optionally includes wherein the instructions further comprise instructions that when executed cause the machine to: broadcast a request for a block map for the available update to nearby devices; receive a block map for the available update from a third nearby device; and determine what blocks of the available update are needed by the machine.

In Example 5 the subject matter of Example 4 optionally includes wherein the instructions that when executed cause the machine to broadcast a request for the available update comprise instructions that when executed cause the machine to: broadcast a request for blocks of the available update based on the determination of what blocks of the available update are needed by the machine; and receive at least a portion of the requested blocks from a nearby device.

In Example 6 the subject matter of any of Examples 1-3 optionally includes wherein the instructions that when executed cause the machine to broadcast the request for updates to nearby devices comprise instructions that when executed cause the machine to broadcast the request using a communication interface different from a communication interface used for connecting to the Internet.

In Example 7 the subject matter of any of Examples 1-3 optionally includes wherein the instructions further comprise instructions that when executed cause the machine to: verify the validity of each block of the available update received.

Example 8 is a method of updating a programmable device, comprising: broadcasting a first request for updates to nearby devices; receiving an acknowledgment identifying an available update from a first nearby device; broadcasting a second request for the available update to nearby devices; and receiving a portion of the available update from a second nearby device.

In Example 9 the subject matter of Example 8 optionally includes wherein broadcasting the first request for updates to nearby devices comprises: broadcasting the first request using a different communication interface than used for Internet communication.

In Example 10 the subject matter of Example 8 optionally includes wherein the first nearby device and the second nearby device are the same device.

In Example 11 the subject matter of any of Examples 8-10 optionally includes wherein broadcasting the first request for updates to nearby devices comprises broadcasting the first request to nearby devices of the same type as the programmable device.

In Example 12 the subject matter of any of Examples 8-10 optionally includes further comprising: broadcasting a third request for a block map for the available update to nearby devices; receiving the block map for the available update from a third nearby device; and determining what blocks of the available update are needed to install the available update.

In Example 13 the subject matter of Example 12 optionally includes wherein broadcasting the second request for the available update comprises: broadcasting a request for blocks of the available update based on the determination of what blocks of the available update are needed for installing the available update; and receiving at least a portion of the requested blocks from a nearby device.

In Example 14 the subject matter of Example 13 optionally includes further comprising receiving at least another portion of the requested blocks from a plurality of nearby devices.

In Example 15 the subject matter of any of Examples 8-10 optionally includes wherein the programmable device is moving relative to the first nearby device and the second nearby device.

Example 16 is a system for assisting a device without an Internet connection to receive software updates, comprising: a first programmable device, at least temporarily having no Internet connection, comprising: a first processing element; a first memory, having instructions stored thereon, comprising instructions that when executed cause the first processing element to: broadcast a request for assistance in obtaining a software update to nearby devices; and receive the software update from a nearby device; and a second programmable device, at least temporarily positioned near to the first programmable device, comprising: a second processing element; a second memory, having instructions stored thereon, comprising instructions that when executed cause the second processing element to: receive broadcast requests for assistance in updating the software update from the first programmable device; determine whether the second programmable device has the software update; and transmit the software update to the first programmable device, responsive to the determination.

In Example 17 the subject matter of Example 16 optionally includes wherein the first programmable device and the second programmable device are manufactured by the same manufacturer.

In Example 18 the subject matter of any of Examples 16-17 optionally includes wherein the instructions stored in the first memory further comprise instructions that when executed cause the first processing element to: receive an indication that the second programmable device does not have the software update available for delivery to the first programmable device; wait for a predetermined period of time; and repeat broadcasting the request for the software update to nearby devices.

In Example 19 the subject matter of any of Examples 16-17 optionally includes wherein the instructions stored in the second memory further comprise instructions that when executed cause the second processing element to: determine that the second programmable device does not have the software update requested by the first programmable device; respond to the first programmable device indicating lack of availability of the software update by the second programmable device; and obtain the software update from an update server via the Internet.

In Example 20 the subject matter of any of Examples 16-17 optionally includes wherein the first programmable device and the second programmable device communicate using different communication interfaces than used for Internet connectivity.

Example 21 is a method of assisting providing software updates to another programmable device, comprising: receiving by a first device a request for assistance in obtaining a software update from a second device; determining whether the first device has the software update; responding the request from the second device with an indication that the first device does not have the software update responsive to a determination does not have the software update; and transmitting the software update to the second device responsive to a determination that the first device has the software update.

In Example 22 the subject matter of Example 21 optionally includes wherein the first device and the second device are manufactured by the same manufacturer.

In Example 23 the subject matter of any of Examples 21-22 optionally includes further comprising: requesting the software update from an update server responsive to the determination that the first device does not have the software update.

In Example 24 the subject matter of any of Examples 21-22 optionally includes wherein receiving by the first device the request for assistance in obtaining the software update comprises: receiving the request using a communication interface other than a communication interface used for Internet connectivity.

In Example 25 the subject matter of any of Examples 21-22 optionally includes wherein the software update comprises a plurality of blocks, and wherein each of the plurality of blocks contains information to allow the second device to determine validity of received blocks.

Example 26 is an apparatus configured for receiving software updates, comprising: means for broadcasting a request for updates to nearby devices; means for receiving an acknowledgment identifying an available update from a first nearby device; means for broadcasting a request for the available update to nearby devices; and means for receiving a portion of the available update from a second nearby device.

In Example 27 the subject matter of Example 26 optionally includes wherein the first nearby device and the second nearby device are the same device.

In Example 28 the subject matter of Example 26 optionally includes wherein the apparatus and the first nearby device are the same type of device.

In Example 29 the subject matter of any of Examples 26-28 optionally includes further comprising: means for broadcasting a request for a block map for the available update to nearby devices; means for receiving a block map for the available update from a third nearby device; and means for determining what blocks of the available update are needed by the machine.

In Example 30 the subject matter of Example 29 optionally includes wherein the means for broadcasting a request for the available update comprises: means for broadcasting a request for blocks of the available update based on the determination of what blocks of the available update are needed by the machine; and means for receiving at least a portion of the requested blocks from a nearby device.

In Example 31 the subject matter of any of Examples 26-28 optionally includes wherein the means for broadcasting the request for updates to nearby devices comprises means for broadcasting the request using a communication interface different from a communication interface used for connecting to the Internet.

In Example 32 the subject matter of any of Examples 26-28 optionally includes further comprising: means for verifying the validity of each block of the available update received.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium on which are stored instructions for sharing software updates using an opportunistic peer-to-peer schema, wherein peer-to-peer communications are performed through locally available channels excluding any Internet connection, comprising instructions that when executed cause a machine to:
  broadcast a first request for updates to peer devices within a range of the locally available channels at a time of the first request;
  receive an acknowledgment of the first request identifying an available update from a first device of the peer devices;
  broadcast, in response to the acknowledgement, a second request for the available update to the peer devices within the range of the locally available channels at a time of the second request;
  receive a portion of the available update from a second device of the peer devices while missing a remaining portion of the available update;
  determine, using a block map of the available update, that the remaining portion of the available update is needed to complete the available update;
  broadcast a third request to the peer devices within the range of the locally available channels at a time of the third request for the remaining portion of the available update based on the determination that the remaining portion of the available update is needed to complete the available update; and receive, in response to the third request, the remaining portion of the available update from one of the peer devices via the locally available channels, wherein the one of the peer devices is different form the second device.

2. The non-transitory machine readable medium of claim 1, wherein the first device and the second device are a same device.

3. The non-transitory machine readable medium of claim 1, wherein the machine and the first device are of a same type of device.

4. The non-transitory machine readable medium of claim 1, wherein to determine, using the block map of the available update, that the remaining portion of the available update is needed to complete the available update comprises to:
broadcast a request for the block map of the available update to the peer devices;
receive the block map of the available update from a third device of the peer devices; and
determine what blocks of the available update are needed by the machine.

5. The non-transitory machine readable medium of claim 4, wherein to broadcast the third request comprises to:
broadcast a request for blocks of the available update based on the determination of what blocks of the available update are needed by the machine; and
receive at least a portion of the requested blocks from one of the peer devices.

6. The non-transitory machine readable medium of claim 1, wherein to broadcast the first request for updates to the peer devices comprises to broadcast the first request for updates using a communication interface different from a communication interface used for connecting to Internet.

7. The non-transitory machine readable medium of claim 1, wherein the instructions further comprise instructions that when executed cause the machine to:
verify the validity of each block of the available update received.

8. A method of updating a programmable device using an opportunistic peer-to-peer schema, wherein peer-to-peer communications are performed through locally available channels excluding any Internet connection, comprising:
broadcasting a first request for updates to peer devices within a range of the locally available channels at a time of the first request;
receiving an acknowledgment of the first request identifying an available update from a first device of the peer devices;
broadcasting a second request for the available update to the peer devices within the range of the locally available channels at a time of the second request;
receiving, in response to the second request, a portion of the available update from a second device of the peer devices, while missing a remaining portion of the available update;
determining, using a block map of the available update, that the remaining portion of the available update is needed to complete the available update;
broadcasting a third request to the peer devices within the range of the locally available channels at a time of the third request, for the remaining portion of the available update based on the determination that the remaining portion of the available update is needed to complete the available update; and receiving, in response to the third request, at least the remaining portion of the available update from one of the peer devices via the locally available channels, wherein the one of the peer devices is different from the second device.

9. The method of claim 8, wherein broadcasting the first request for updates to the peer devices comprises:
broadcasting the first request using a different communication interface than used for Internet communication.

10. The method of claim 8, wherein the first device and the second device are a same device.

11. The method of claim 8, wherein broadcasting the first request for updates to the peer devices comprises broadcasting the first request to devices of a same type as the programmable device.

12. The method of claim 8, further comprising:
broadcasting a third request for a block map for the available update to the peer devices;
receiving the block map for the available update from a third device of the peer devices; and
determining what blocks of the available update are needed to install the available update.

13. The method of claim 12, wherein broadcasting the second request for the available update comprises:
broadcasting a request for blocks of the available update based on the determination of what blocks of the available update are needed for installing the available update; and
receiving at least a portion of the requested blocks from a device.

14. The method of claim 13, further comprising receiving at least another portion of the requested blocks from one of a plurality of devices being within the range of the locally available channels of the requesting device.

15. The method of claim 8, wherein the programmable device is moving relative to the first device and the second device.

16. A system for assisting a device without an Internet connection to receive software updates using an opportunistic peer-to-peer schema, wherein peer-to-peer communications are performed through locally available channels, comprising:
a first programmable device, at least temporarily having no Internet connection, comprising:
a first processing element;
a first memory, having instructions stored thereon, comprising instructions that when executed cause the first processing element to:
broadcast a first request for assistance in obtaining a software update to peer devices within a range of the locally available channels at a time of the first request;
receive a portion of the software update from one of the peer devices, while missing a remaining portion of the available update;
determine, using a block map of the available update, that the remaining portion of the software update is needed to complete the available update;
broadcast a second request for the remaining portion of the available update based on the determination that the remaining portion of the software update is needed to the peer devices within the range of the locally available channels at a time of the second request; and receive, in response to the second request, the remaining portion of the software update from one of the peer devices; and a second programmable device, at least temporarily positioned within the range of the locally available channels of the first programmable device, comprising:
- a second processing element;
- a second memory, having instructions stored thereon, comprising instructions that when executed cause the second processing element to:
  - receive broadcast requests for assistance in obtaining the software update from the first programmable device;
  - determine whether the second programmable device has the software update; and
  - transmit the software update to the first programmable device, responsive to the determination.

17. The system of claim 16, wherein the first programmable device and the second programmable device are manufactured by a same manufacturer.

18. The system of claim 16, wherein the instructions stored in the first memory further comprise instructions that when executed cause the first processing element to:
receive an indication that the second programmable device does not have the software update available for delivery to the first programmable device;
wait for a predetermined period of time; and
repeat broadcasting a request for the software update to the peer devices within the range of the locally available channels at the time of the second request.

19. The system of claim 16, wherein the instructions stored in the second memory further comprise instructions that when executed cause the second processing element to:
determine that the second programmable device does not have the software update requested by the first programmable device;
respond to the first programmable device indicating lack of availability of the software update by the second programmable device; and
obtain the software update from an update server via the Internet.

20. The system of claim 16, wherein the first programmable device and the second programmable device communicate using different communication interfaces than used for Internet connectivity.

* * * * *